United States Patent [19]

Olsson

[11] 4,294,149
[45] Oct. 13, 1981

[54] APPARATUS FOR MEASURING AND ORIENTING LOGS FOR SAWING

[75] Inventor: Lars J. Olsson, Linkoping, Sweden

[73] Assignee: Saab-Scania AB, Jonkoping, Sweden

[21] Appl. No.: 68,904

[22] Filed: Aug. 23, 1979

Related U.S. Application Data

[63] Continuation-in-part of Ser. No. 856,130, Dec. 1, 1977, abandoned.

[51] Int. Cl.³ .................. B27B 15/04; B27B 29/04; B27B 1/00; B56G 47/90
[52] U.S. Cl. .................................. 83/435.1; 83/71; 83/437; 83/361; 144/312; 144/39; 144/242 R; 414/745; 414/753
[58] Field of Search ............... 83/435.1, 71, 360, 361, 83/437; 144/312, 3 R, 242 R, 39; 414/745, 753

[56] References Cited

U.S. PATENT DOCUMENTS

| | | | |
|---|---|---|---|
| 3,960,041 | 6/1976 | Warren et al. | 83/361 |
| 4,139,035 | 2/1979 | Bystedt et al. | 144/312 |
| 4,147,259 | 4/1979 | Nilsson | 83/435.1 |
| 4,152,960 | 5/1979 | Detjen | 144/39 X |

*Primary Examiner*—Donald R. Schran
*Attorney, Agent, or Firm*—James E. Nilles; James R. Custin

[57] ABSTRACT

Log processing apparatus comprises a cutting machine that defines a substantially vertical cutting plane, feed mechanism that feeds a log through the cutting machine in substantially lengthwise horizontal motion parallel to the cutting plane, a measuring station spaced horizontally and vertically from the cutting machine, and transfer mechanism by which a log is carried in horizontal translatory motion from the measuring station to the feed mechanism. At the measuring station, or before the log reaches that station, it is established in an optimum rotational orientation which is thereafter maintained through transfer of support of the log to a set of jaws on the feed mechanism. At the measuring station a relationship is ascertained between a calculated plane that extends lengthwise in the log and a reference plane defined at the measuring station that has a fixed relationship to the cutting plane. The transfer mechanism comprises supporting elements by which a log is confined against all motion except such translatory motion as is imparted to it by the transfer mechanism. The feed mechanism comprises two pairs of jaws, each pair arranged to clampingly grip a log without causing any shifting of it but also arranged for controlled lateral shifting in unison when gripping a log. Either the transfer mechanism or the feed mechanism translatingly elevates a log to the level for cutting, and after the feed mechanism jaws grip the log they shift it laterally to establish it with said calculated plane in a desired relationship to the cutting plane.

12 Claims, 12 Drawing Figures

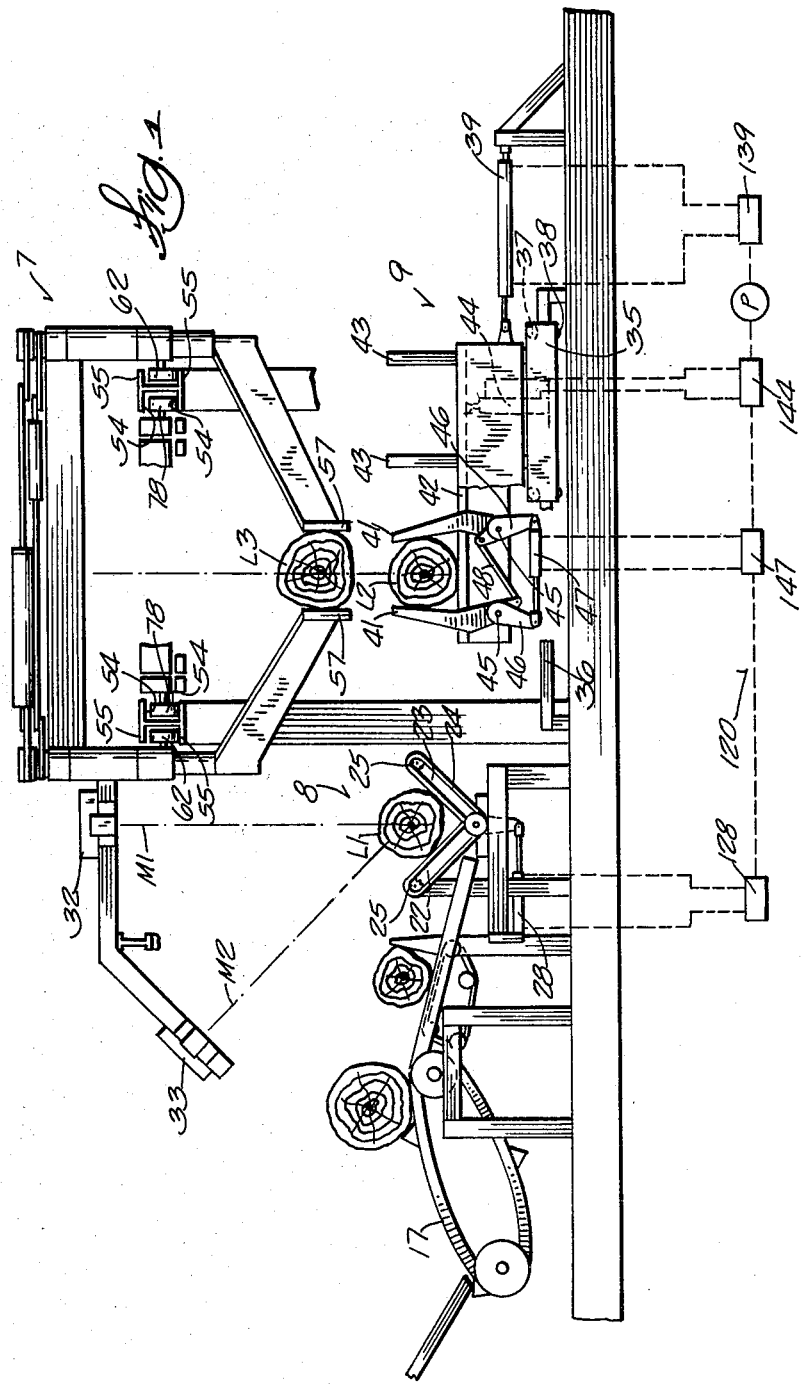

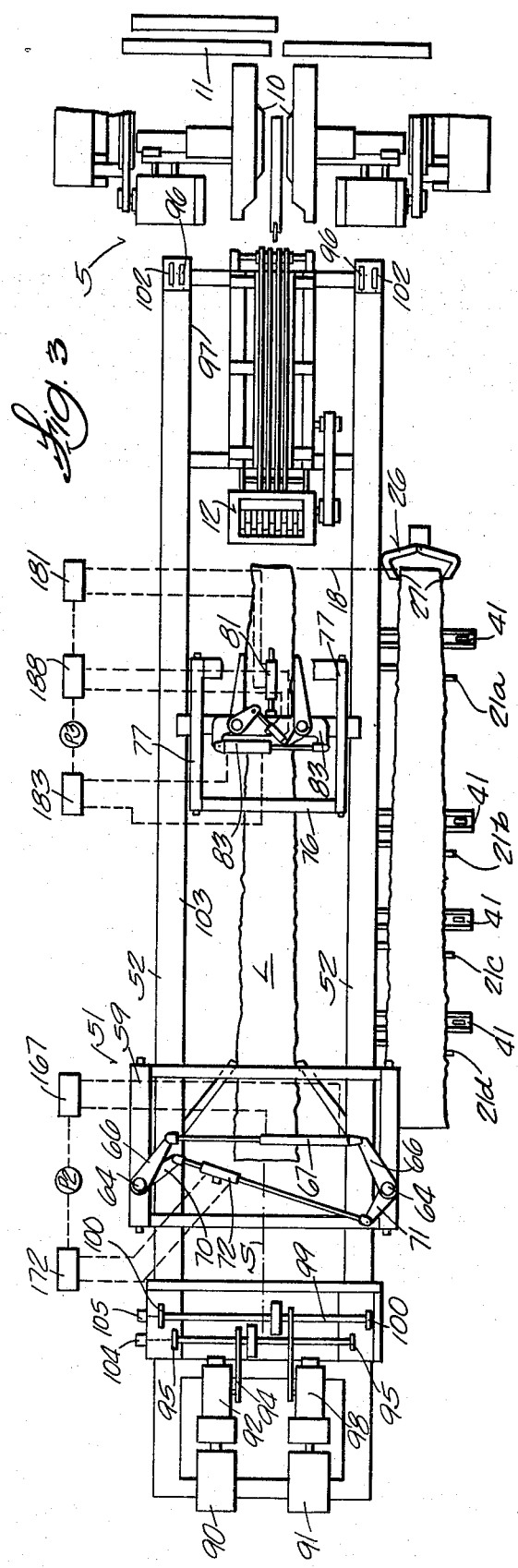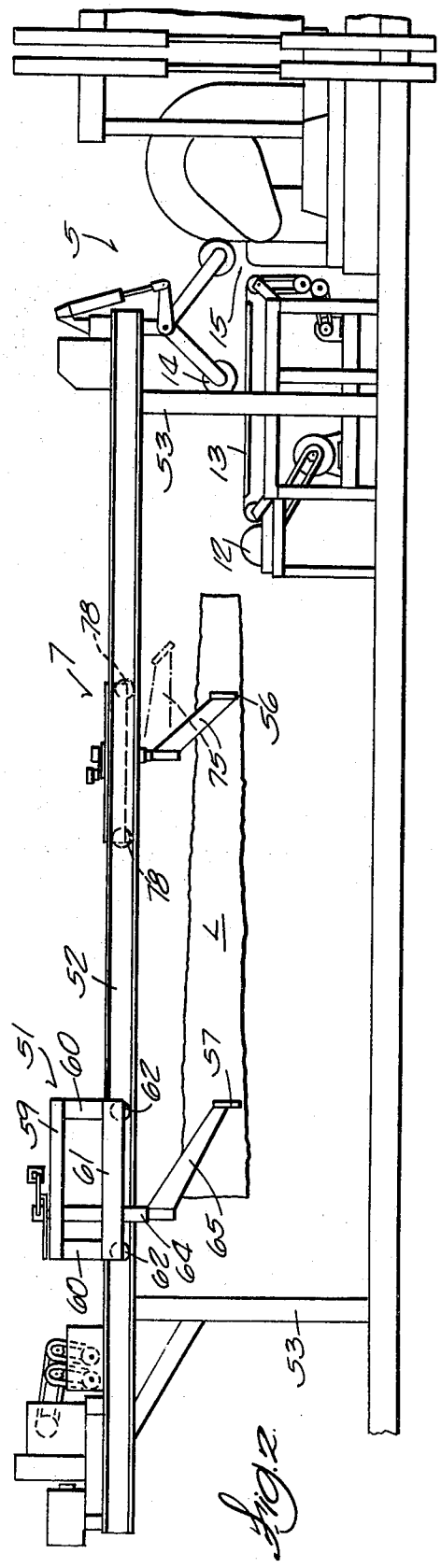

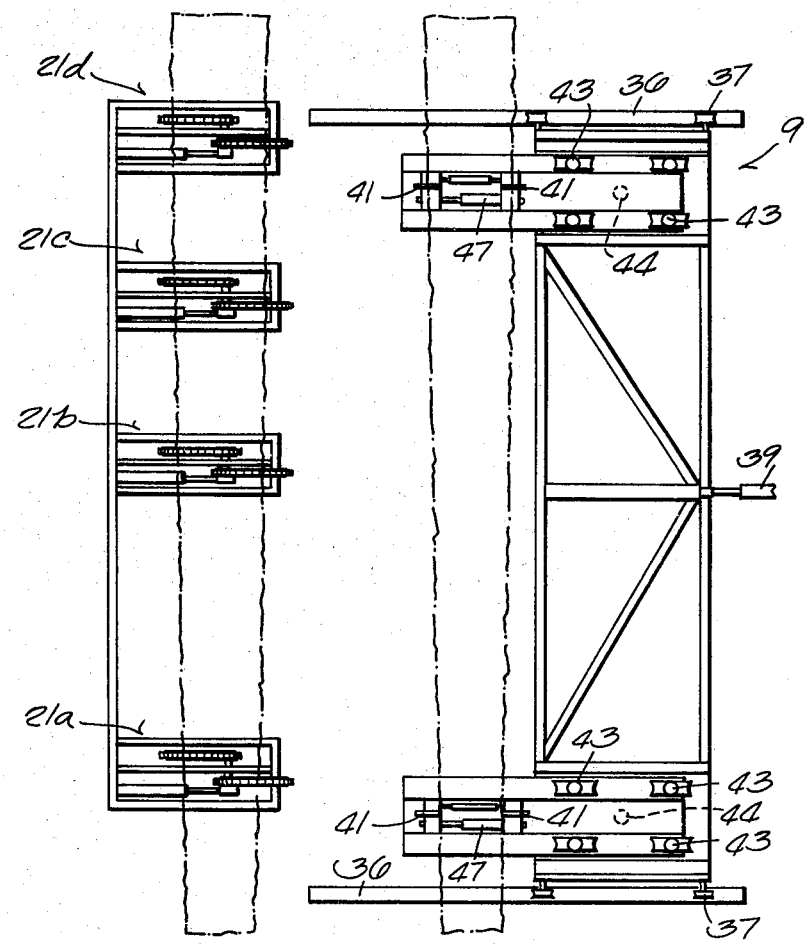

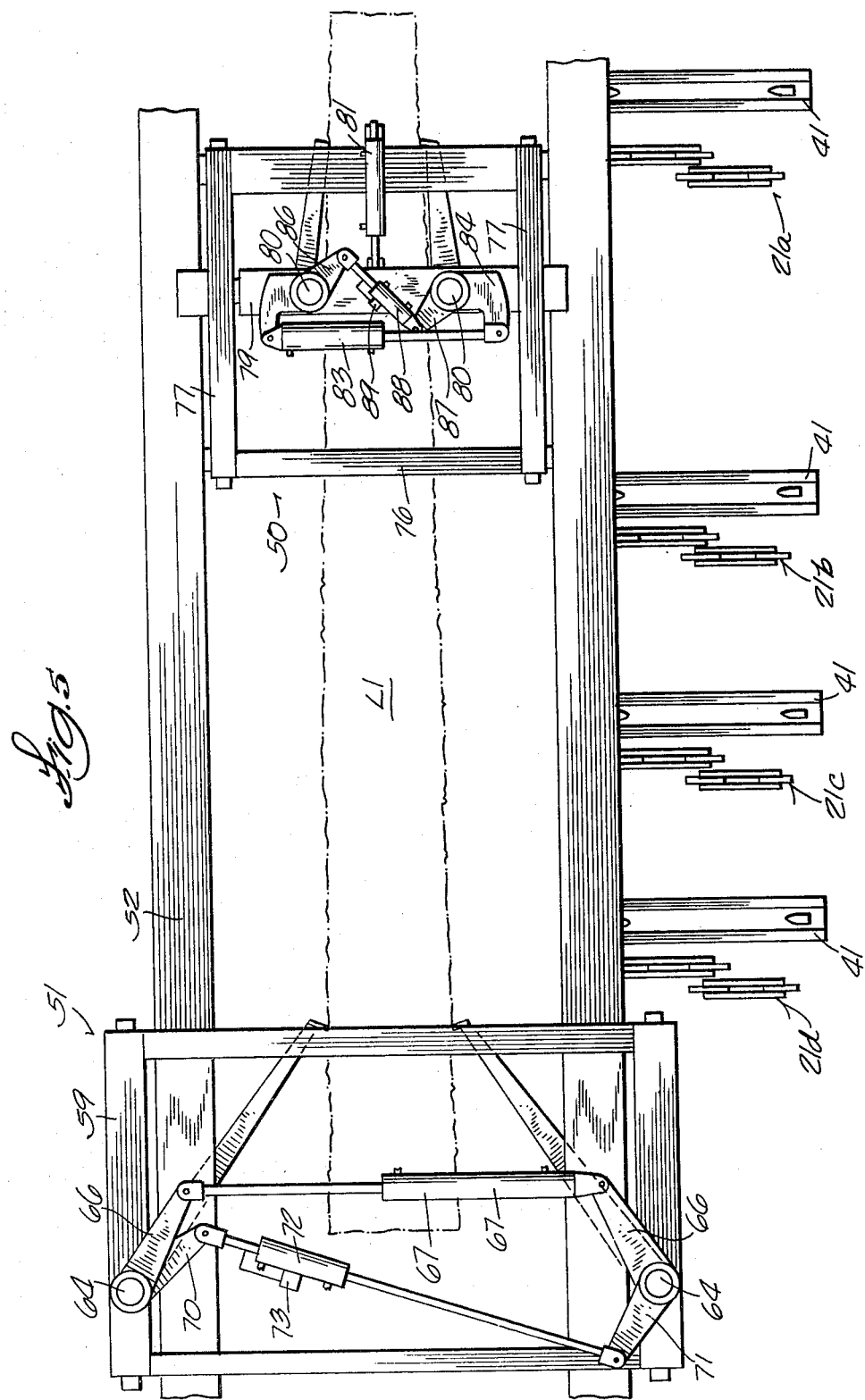

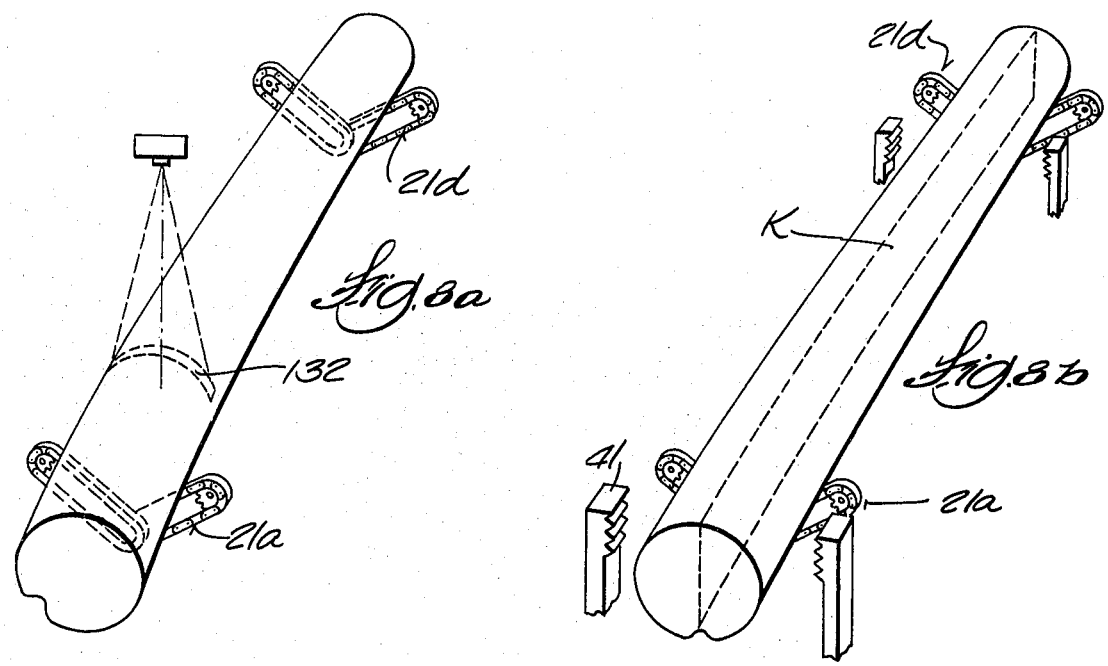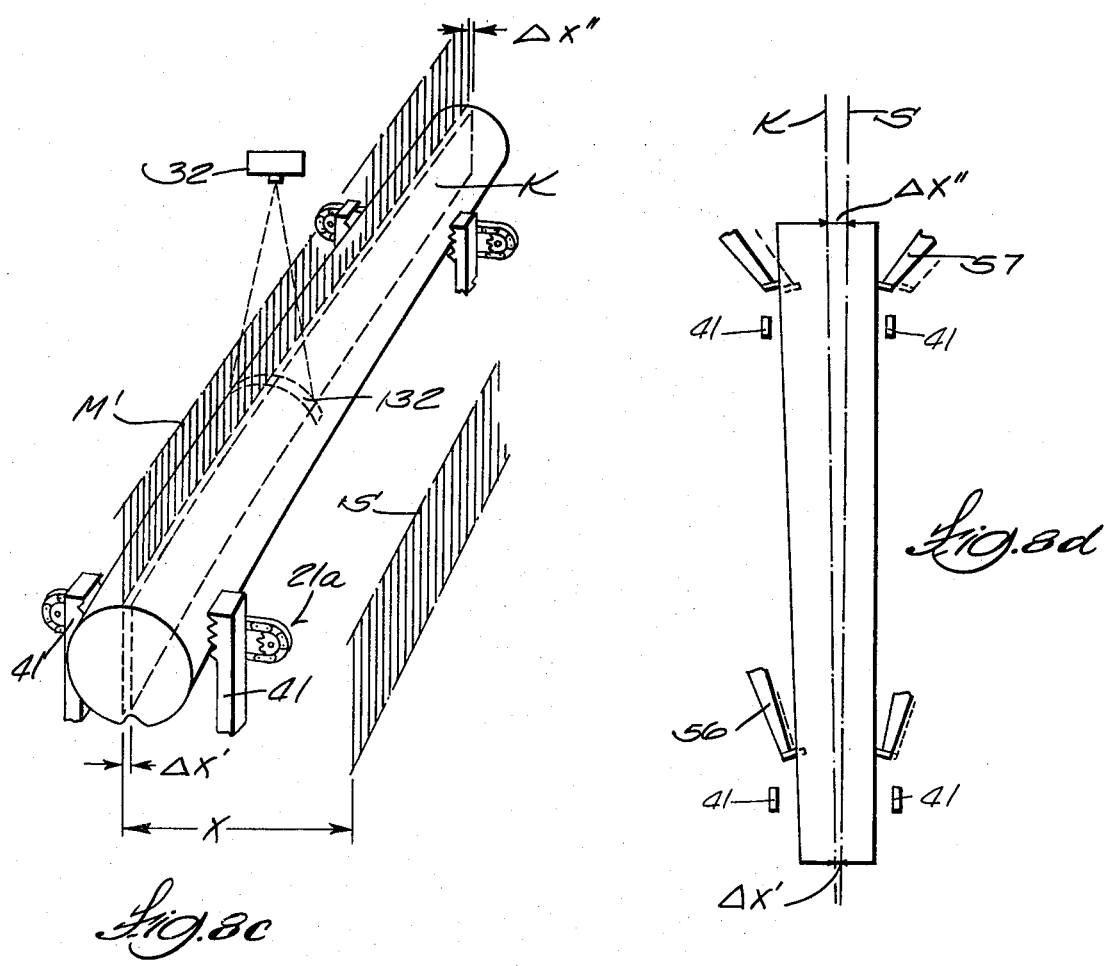

APPARATUS FOR MEASURING AND ORIENTING LOGS FOR SAWING

RELATED APPLICATION

This application is a continuation-in-part of my allowed application Ser. No. 856,130, filed Dec. 1, 1977, now abandoned.

FIELD OF THE INVENTION

This invention relates to the sawing of lumber from logs, and the invention is more particularly concerned with a method and means for so orienting each of a succession of logs being fed to a cutting machine that the lumber cut from each log will be shaped and sized to have the maximum obtainable economic value, to thus achieve optimum utilization of the material in the log.

BACKGROUND OF THE PRIOR ART

In a sawmill in which logs are sawed into boards, planks and the like, each log is cut by advancing it lengthwise in a horizontal feed direction through a cutting machine that usually comprises one or more band saws or frame saws and may include milling cutters or the like for trimming side surfaces of the log to flatness. Ordinarily, blades or other cutters in the cutting machine are oriented vertically and define a cutting plane that extends horizontally in the feed direction. For feed through the cutting machine, each log is secured to a feed carriage that is constrained to translatory motion in the feed direction.

It is well known that the number of finished pieces that can be cut from a particular log, and the sizes of the several pieces, are dependent upon the positioning of the log on the feed carriage and its orientation in relation to the cutting plane. Heretofore it has been the usual practice to rely upon a highly skilled operator, working with manually controlled instrumentalities, to establish each log on the feed carriage in a position and orientation that would, in his judgment, result in optimum yield from the log. To this end the operator usually rotated the log to a position in which the presumbly best side was uppermost, and then oriented the log by swinging its ends sidewardly as he deemed necessary. When the log was curved along its length, it was customary to rotate it to a position in which its convex side was uppermost, so that it was as nearly as possible symmetrical to the cutting plane. At best, however, this could result in no more than a rough approximation of the optimum orientation of the log because the operator's estimate could give little or no weight to other irregularities in the geometry of the log, such as irregular taper along its length or portions having markedly flattened, oval or elliptical cross sections.

The problem of effecting a truly optimum orientation of every log is an extremely complex one because it depends not only upon the geometry of each particular log but also upon economic factors that change from time to time. The relative economic value of a given piece of finished lumber has no necessary relationship to the volume of material that it contains but depends upon its utility and upon prevailing supply and demand. A given log can often be cut according to any of two or more different cutting patterns that require different orientations and positionings of the log and produce different yields of finished pieces. In such a case, the optimum cutting pattern is of course the one that yields pieces which, together, sell for the maximum total price under prevailing market conditions.

These many factors had to be considered by the operator, individually and in their complicated relationship to one another, during the very short time that was available for orienting each of a succession of logs that had to be kept moving through the sawing machine; and his judgments had to be made without any of the measurements upon which accurate results necessarily depended. Obviously, even the most highly skilled operator could not be expected to achieve truly optimum yields with any degree of consistency.

Recent developments in the lumber industry have increased the difficulty of achieving optimum yields by manual orientation and have at the same time increased the urgency of obtaining the optimum yield from every log. Increasing demand for lumber in the face of a decreasing supply has resulted in the harvesting of younger and smaller trees and trees of more irregular shape than formerly; and the same supply and demand situation has made it imperative that existing lumber resources be conserved by obtaining optimum yield from every harvested tree. For some time, therefore, there have been intensive efforts to achieve both automatic measurement and automatic orientation of each log with the use of automatic measurement apparatus coupled with a computer that takes account of both measurement data and pertinent economic data.

U.S. Pat. No. 3,459,246 disclosed apparatus that required an operator to manually turn each log to a rotational position that he judged to be favorable for sawing, and whereby the log was then scanned by means of an arrangement of photocells that determined its smallest diameter. On the basis of that diameter measurement, band saw blades by which the log was to be cut were adjusted laterally in relation to one another to positions that would result in the presumably optimum cuts. The apparatus included no means for orienting the log laterally in the optimum lengthwise relationship to the cutting plane. Since the only dimension of the log that was taken into account was its minimum diameter, the apparatus obviously operated on the basis of data that was insufficient to ensure optimum yield and in that respect achieved little or no improvement over the results obtained with entirely manual adjustments.

The apparatus of U.S. Pat. No. 3,459,246 has a further deficiency in being so arranged that each log was delayed for a time in a zone in which it was rotated and measured, and from that zone the log was transported lengthwise to the in-feed mechanism for the sawing machine. As a result, there was a substantial interval of delay from the time when the sawing of one log was completed until the sawing of the next succeeding log would begin, and the apparatus therefore has a relatively low production capacity.

U.S. Pat. No. 3,190,323 discloses apparatus whereby, during the sawing of one log, the next succeeding log was rotated and shifted laterally to an estimated optimum position in a zone that was spaced below the in-feed mechanism. The oriented log was next translated upwardly to the in-feed mechanism, where a toothed striking member was driven into its rear end. During feed through the cutter the log was supported only by a roller under its front end and by the striking member, which also imparted forward feed motion to it. The log thus had very poor guidance and was not under positive control during cutting, so that there was no assurance of its predetermined cutting orientation being maintained.

Methods and apparatus have also been proposed whereby measurements were taken from which a calculation was made of a predetermined mathematical figure or body (parallelogram, cylinder or the like) which could be inscribed within the surface of an uncut workpiece and which was assumed to be representative for the desired scheme of cutting. The centerline of the calculated, theoretically inscribed figure or body was determined by a further calculation, and the workpiece was adjusted to bring that centerline into coincidence with the cutting plane. U.S. Pat. No. 3,970,128 discloses apparatus of this character, employed for automatic orientation of cants for their passage through an edge trimmer. Such apparatus was adequate for optimizing the yield from cants and similar essentially two-dimensional pieces, inasmuch as the assumptions upon which it operated were valid for such pieces; but with logs and similar essentially three-dimensional pieces, merely lateral adjustments are insufficient to ensure that the most profitable cuts will be made. When such apparatus is used, for example, for cutting a log having substantial lengthwise taper or a markedly non-circular cross-section, a large amount of material is wasted from one or both sides of the log, and especially from that portion of the length of the log that is nearest its root end.

Apparatus is also known for measuring the so-called sweep of a log, that is, the departure of its actual longitudinal centerline from true straightness. See for example U.S. Pat. No. 3,806,253. Again, such sweep is only one of the geometrical factors that should be taken into account in a valid calculation of the orientation in which the log must be established if it is to be cut for optimum yield.

It will be evident at this point that the problem of achieving optimum cutting orientation of a log can only be solved by obtaining a relatively large amount of measurement data by which the geometrical peculiarities of the log are fully defined. With an automatic computer there is no great problem in making the necessary calculation from the measurement data, once obtained. Furthermore, if it within the state of the art to employ automatic measurement means for obtaining the necessary data. As appears from the foregoing discussion, however, what has heretofore been lacking is complete control over all aspects of workpiece orientation, to enable data obtained from measurements to be utilized to full advantage.

It will be evident that the necessary measurements should be made with a minimum of manipulation of each log. Furthermore, since the measurements are used for the calculation of a plane that lies in the log and moves with it, the log must ultimately be established in such a position and orientation that calculated plane is parallel to the cutting plane and at a predetermined distance from it. Hence, from the beginning of the measurement process, all movement of the log must be accurately controlled in order to ensure that the cutting of the log will actually take place in exact accordance with calculations. The importance of accuracy in positioning the measured log on the feed mechanism and maintaining its orientation during cutting is apparent from the fact that an improvement in cutting accuracy of as little as 2 mm. can increase profitability by about 2%. In many cases, assuming reasonably accurate measurement, correspondingly accurate positioning of a log for sawing can enable a useful board to be produced from a side portion of it that would other wise be reduced to chips. For production efficiency, provisions for control of log orientation should not interfere with feeding of logs to the cutting machine in a steady flow, so that there is no substantial delay between successive logs.

SUMMARY OF THE INVENTION

The general object of the present invention is to provide a method and apparatus whereby measurement and orientation of logs or the like for optimum cutting are accomplished in a manner that enables the workpieces to be processed in rapid succession, so that a high rate of production is achieved along with optimum yield, but with complete control over the orientation of the workpieces from the time measurement begins until cutting is completed.

More specifically, it is an object of the invention to provide a method and means for taking measurements on a log or the like so that the geometrical features of the log that are essential to optimum cutting can be fully and accurately ascertained, to enable optimum yield from the log to be calculated by means of a computer, whereby such measurements can be made with a minimum of movements of the log and in less time than is required for sawing of a log, and whereby all movements of the log are fully and accurately controlled from the time measurement begins until sawing of the log is completed, to ensure that the calculated optimum yield will actually be obtained.

Another object of this invention is to provide a method and apparatus for complete control of the orientation of a log or similar workpiece from the time it enters a measuring station under it has passed through a cutting machine, whereby the orientation of the workpiece can be controlledly changed at the measuring station for purposes of measurement or estimate and whereby the orientation of the workpiece can be further controlledly changed in the course of its transfer from the measuring station to the cutting machine, to enable the workpiece to be presented to the cutting machine, for translatory motion through it, in exactly an orientation that has been determined to be optimum for cutting of the workpiece on the basis of measurements or estimates made at the measuring station, all without delay in the processing of successive workpieces.

BRIEF DESCRIPTION OF DRAWINGS

In the accompanying drawings, which illustrate what are now regarded as the best mode of applying the principles of the invention in practice:

FIG. 1 is an end view of log processing apparatus embodying the principles of the present invention;

FIG. 2 is a view in side elevation of that portion of the log processing apparatus that comprises the sawing machine and the feed mechanism by which a log is fed into the sawing machine;

FIG. 3 is a top view of the log processing apparatus shown in FIG. 1;

FIG. 4 is a somewhat simplified plan view of the transfer mechanism in its relation to the feed station;

FIG. 5 is a view generally similar to FIG. 3, but on a larger scale and showing only a portion of the feed mechanism;

FIGS. 8a-8d are diagrammatic views illustrating, in sequence, the successive steps in the processing of a log according to the method of this invention.

DETAILED DESCRIPTION OF PREFERRED EMBODIMENTS

General Arrangement

Figure 6:
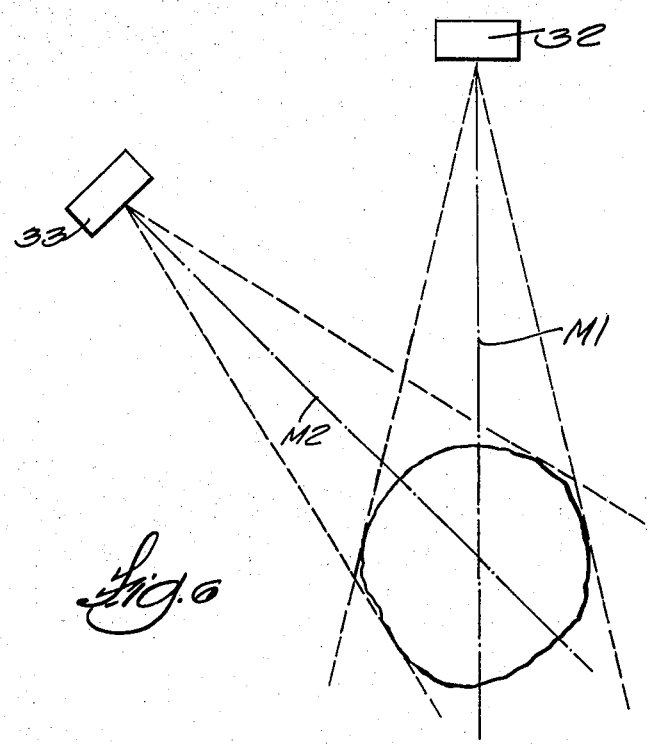
FIG. 6 is a diagrammatic view illustrating measurements taken during scanning of a log at the measuring station.

Referring now to the accompanying drawings, and first referring particularly to FIGS. 1, 2 and 3, apparatus embodying the present invention comprises a sawing or cutting machine designated generally by 5 through which logs L are fed one-by-one by means of a feed mechanism designated generally by 7. It will be understood that the workpieces herein characterized as logs could be other log-like articles, as for example blocks, i.e., lumber pieces having two planar parallel surfaces but otherwise rough and irregular. As will appear as the description proceeds, each log is supported by the feed mechanism 7 in an orientation and lateral position which is distinctive to the particular log and which will result in an optimum yield from it. For the purpose of obtaining measurement data about each log, from which its optimum orientation in the feed mechanism 7 can be calculated, logs destined to pass through the cutting machine 5 are first delivered one-by-one to a measuring station 8. From the measuring station, each log is carried to the feed mechanism 7 by means of a transfer mechanism designated generally by 9. The apparatus is so arranged that while one log L3 is being fed through the cutting machine 5 by the feed mechanism 7, a second log L2 is in transit from the measuring station 8 to the feed mechanism on the transfer mechanism 9, and a third log L1 is being processed at the measuring station.

The sawing or cutting machine 5 can be of any suitable type. It is here illustrated as a reducer saw comprising cutters 10 in the nature of milling cutters, by which material is removed from opposite sides of a log to bring its sides to flatness and parallelism, and one or more saw bands 11 past which the log moves immediately after being acted upon by the cutters 10 and which can saw the log lengthwise into two or more pieces. As shown, the cutting elements 10, 11 of the cutting machine are disposed to define a vertical cutting plane S that extends horizontally in a feed direction along which logs are carried in translatory more or less lengthwise motion by the feed mechanism 7. However, it will be understood that the cutting elements 10, 11 of the cutting machine could be so oriented that the cutting plane S is inclined to the vertical. The cutting plane S may be a plane on which a central longitudinal cut through the log is to be made, or may be a plane on which one of a plurality of parallel longitudinal cuts are to be made, or may be a plane on which no actual cut is made but to which all cuts are to be parallel; hence the cutting plane may be regarded as any single plane through the cutting machine, parallel to the cut or cuts made by that machine, and from which said cut or cuts have a predetermined spacing which may be zero.

The cutting machine can also comprise a planar 12 which is located some distance ahead of the vertical cutting elements 10, 11 and which trims at least portions of the bottom surface of a log to flatness before the log is engaged by the vertical cutting elments. Between the planer 12 and the vertical cutting elements there is a belt conveyor 13 having a flat, horizontal upper stretch lying in the cutting plane of the planer 12. After a log has moved across the planer, a hold-down roller 14 bears downwardly upon it to maintain its flat bottom surface portions firmly engaged against the conveyor 13, whereby it is guided into engagement with feed rolls 15 which, in turn, guidingly feed it to the vertical cutting elements 10, 11. The conveyor 13 and feed rolls 15 can thus take over guidance and feeding transport of a log after it has been released by the feed mechanism 7.

Measuring Station

In the embodiment of the invention illustrated in FIGS. 1-5, the measuring station 8 is spaced a distance to one side of the cutting plane S. Logs L are brought to the measuring station one-by-one by means of a chain conveyor 17 on which they are transported transversely to their lengths. In moving to and through the measuring station the logs have more or less the same orientation that they will have as they are advanced through the cutting machine 5, that is, each log has its length substantially horizontal and more or less parallel to the cutting plane S. As shown, all of the logs have their narrower upper ends towards the sawing machine, and for simplicity it is assumed in the following description that they are so oriented, although it is not necessary that they be so oriented. Preferably, before reaching the measuring station, all of the logs are so aligned, in a known manner, that their upper end surfaces lie in a common vertical plane 18 that is normal to the cutting plane.

The measuring station 8 defines a measuring zone extending to opposite sides of a reference plane M1 that is in a known, fixed relation to the cutting plane S (e.g., parallel to the cutting plane) and is spaced a substantial distance to one side of it. Mechanically, the measuring station comprises a plurality of log supports 21a-21d that are arranged in a horizontally extending row. Each log support comprises a pair of chain arms 22, 23 that are swingable up and down, to and from an operative position shown in FIG. 1, about a horizontal axis that lies in the reference plane M1. In the operative position of a log support, its two chain arms 22, 23 extend obliquely upwardly and laterally away from one another to define a V in which a log can be cradled. In the inoperative position, both arms are horizontal.

Every log is supported in the measuring zone by only two of the log supports, one of them being the front support 21a, which is located near the transverse vertical plane 18 and which supports the log near its top end, and the other being whichever one of the other three supports 21b-21d is inwardly nearest the root end of the log. The particular one of the three supports 21b-21d that is to cooperate with a particular log can be selected either manually or by means of automatic apparatus (not shown) that can comprise a sensor which detects the length of each log as it enters the measuring zone. The two supports not needed at any given time remain in their inoperative horizontal positions, in which they are out of the way of logs entering and leaving the measuring zone.

By means of the operative pair of supports 21a and 21b, 21c or 21d, a log at the measuring station is supported in such a manner as to be rotatable but to be substantially confined against other movements. To provide for rotation of the supported log, each of the log support chain arms 22, 23 comprises an endless chain 24 trained around sprockets 25 at opposite ends of the arm and having a straight stretch extending along the side of the arm against which a log engages. A log can be rotated by driving the sprockets 25 in unison, all in the same direction. The amount of rotational displacement imparted to the log can be measured by means of an angle sensor 26 located near the transverse plane 18 and rotatable about a horizontal axis lying in the log. As shown, the angle sensor comprises a pair of claws 27 which are swingable towards and from one another to grip opposite sides of the log near its top end. It will be understood that the log could be rotated by means of a suitable rotary actuator coupled to the claw mechanism 27, and in that case the sprockets 25 would be freely rotatable so that the chains 24 on the chain arms would not interfere with rotation of the log.

Each of the log supports has a double acting cylinder motor 28 by which its chain arms 22, 23 are swung up to their operative positions and down to their inoperative positions. The linkage by which each motor 28 is connected with its chain arms is of a known type and is therefore not shown in detail. The motors 28 are connected in a hydraulic circuit 120 that can comprise a pressure fluid pump P and a valve 128 for each motor 28. Each of the valves 128 can be controlled either manually or (preferably) automatically in a manner that will be evident from the functions performed by the chain arms.

Measurement Apparatus and Method

The measurements that are made at the measuring station 8 provide information about the log from which a mathematical model 29 (see FIG. 7) can be produced that defines the geometry of the log in a somewhat simplified form. From this model calculations can be made that define the optimum orientation of the log for cutting. While any such mathematical model must necessarily be based upon certain simplifying assumptions, the assumptions that are made in this case do not result in a model which is materially inaccurate.

Figure 7:
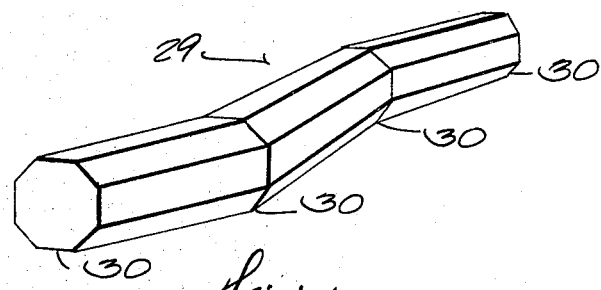
FIG. 7 is a diagrammatic representation of the mathematical model of a log derived from data obtained by scanning.

By the method of this invention, a number of surface stations 30 are defined for the log, spaced at intervals along its length, and at each such surface station measurements are made that enable a polygon to be calculated that circumscribes the log at that station. All such calculated polygons have the same number of sides (e.g., all are octagons), but they are not necessarily regular, and obviously they vary in size as well as in shape from station to station. Corresponding angles of adjacent polygons are then connected by straight lines to produce a model 29 of the log such as is illustrated in FIG. 7.

This measurement method will be more fully understood from the following explanation of how the necessary measurements are made automatically by means of the apparatus illustrated in FIG. 1, which comprises a pair of array cameras 32, 33. An array camera comprises a row of photoelectric cells which are scanned or "emptied" electronically with the use of a pulse signal. The field of view 132 (see FIG. 8*a*) of an array camera is a straight, narrow sweep, the ends of which define, with the camera, a scanning angle at the camera that is bisected by an optical axis of the camera.

The array camera 32 is mounted a substantial distance above the log supports 21*a*–21*d* and is so oriented that its optical axis is contained in the reference plane M1 and its scanning direction is transverse to that plane. It thus scans across the width of a log at the measuring station. Furthermore (although not shown in the drawings), the apparatus at the scanning station includes means by which the field of scan 132 of the array camera 32 is advanced lengthwise along the scanning zone from scanning sweep to scanning sweep, in such a manner that each scanning sweep crosses the log at one of the surface stations 30. Movement of the scanning field 132 from surface station to surface station can be accomplished by bodily translatory movement of the array camera along the reference plane M1 or, as preferred, by means of a swinging mirror arrangement such as is fully disclosed in U.S. Pat. Nos. 3,886,372 and 3,963,938.

The array camera 33 is arranged similarly to the array camera 32, but its optical axis lies in a measuring plane M2 which is inclined at a suitable angle (e.g., 45°) to the reference plane M1 and which intersects the reference plane M1 along a horizontal line that lies in the log. The field of scan of the array camera 33 is likewise caused to move along the length of the log from scan to scan, so that each of its scanning sweeps is made at one of the surface stations.

A first scanning of the log at the measuring station takes place with the log in whatever rotational position it has upon arrival there. At each surface station along the log (see FIG. 6), the array camera 32 measures the angle at the camera between the reference plane M1 and each of the lines that extends from the camera and is tangent to the surface of the log; and at the same surface station the array camera 33 similarly measures angles at the camera between the reference plane M2 and lines from the camera that are tangent to the surface of the log. These measurement values, each of which corresponds to a trigonometric function of angle of scanning sweep in relation to the optical axis of the array camera, are in the form of electrical signals that are fed to a computer (not shown), preferably a suitably programmed general purpose computer.

Upon the basis of the two sets of measurements just described, a quadrangle can be defined that circumscribes the log at the surface station.

Now the log is rotated at the measuring station, preferably through 90°, and is scanned again in the same manner, to obtain information from which another quadrangle can be defined at each surface station. Each side of each quadrangle intersects two sides of the other to define an octagon that circumscribes the log at the surface station. Since the log rests on its surface as it is being rotated, the irregularities of its surface cause it to undergo a certain amount of uncontrolled shifting in directions transverse to its length, and therefore the two quadrangles calculated for each surface station cannot be directly superimposed upon each other to obtain the circumscribing octagon. This means that the set of quadrangles (one for each surface station) derived from the first set of measurements must be mathematically shifted. Since the actual distance and direction of their individual shifts is unknown, but the shifting of each is related to the shifting of all of the others, the criterion employed for controlling the mathematical shifting of those quadrangles is that they be so shifted that the total area of the octagons at the several surface stations is a maximum.

Instead of two array cameras, three array cameras could be used, the axis of one camera being in the reference plane M1 and the other two cameras having their axes in measuring planes at opposite 60° angles to the reference plane. The three cameras would make their scans simultaneously, and the data obtained from them would be used to define a hexagon at each surface station along the log. Although such a three-camera system would avoid the need for rotating the log and would substantially shorten scanning time, it would require more equipment and substantially more lateral space at the scanning station, and the illustrated two camera arrangement is therefore preferred.

The computer that receives outputs from the array cameras 32, 33 calculates a prism 29 which is defined by straight lines connecting corresponding angles of polygons at adjacent surface stations and which serves as a mathematical model of the log.

Certain parameters are stored in the memory of the computer that relate to available cutting patterns, prevailing prices and the like; and on the basis of those parameters and the prismic model derived from the scan or scans, the computer calculates a theoretical plane K which lies in the log and moves with it and which should be established in a predetermined relationship to the cutting plane S for sawing of the log, in order to obtain optimum yield. It will be understood that the calculated plane K could in fact comprise plural parallel planes, along each of which the log is to be cut; hence the calculated plane K can be regarded as any single plane in the log which, for optimum yield, should be parallel to the cutting plane S during cutting, and should also then be at a predetermined distance from the cutting plane, which distance may be zero. The location of the plane K is established in relation to a three-axis coordinate system related to the reference plane M1, to the transverse vertical plane 18, and to a third plane that is mutually perpendicular to those two planes and is in a predetermined relationship to the plane of the upper stretches of the cutting machine belt conveyor 13.

At the measuring station, the log is rotated to a position at which any line that extends transversely to the log and is contained in the calculated plane K is parallel to the cutting plane S. Thus, assuming that the cutting plane S is vertical and that the reference plane M1 is likewise vertical and parallel to the cutting plane, the log is rotated to bring the calculated plane K to a vertical orientation. Of course, with that orientation, the calculated plane K will not necessarily be parallel to the reference plane M1 but will most likely be at a distance from it that varies along the length of the log, as denoted by $\Delta X'$ and $\Delta X''$ in FIG. 8c.

Once the log is established in that optimum rotational orientation, it is maintained in that rotational orientation until it has passed through the cutting machine 5. More acurately, all further movements of the log are effected in such a manner that: if the reference plane M1 is parallel to the cutting plane S, further rotation of the log is prevented; and if the reference plane is non-parallel to the cutting plane, the log is confined to controlled rotation such that it arrives at the feed mechanism with its calculated plane K in the same relation to the cutting plane S that it had to the reference plane M1 at the measuring station.

When the log is established in the desired rotational position at the measuring station, it is transferred to the grip of the transfer mechanism, as explained below and as depicted by FIGS. 8b and 8c. With the particular transfer mechanism that is herein described, some lateral shifting of the log may take place as a result of transfer of its support to the transfer mechanism from the log supports 21a–21d of the measuring station, and therefore, after such transfer of support has occured, but before the log moves away from the measuring station, the log is once again scanned as depicted by FIG. 8c, to obtain an exact measurement of the relationship between the calculated plane K and the reference plane M1. The information obtained from that scanning is subsequently used to so control lateral movements of the log as to bring its calculated plane K into the desired relationship to the cutting plane S.

It will be evident that the equipment can be somewhat simplified, and that a much less complicated program is needed for the computer that makes calculations from the measurement data obtained from scanning, if a semi-automatic procedure is used at the measuring station instead of the fully automatic procedure defined above. For that semi-automatic procedure, an operator manually controls rotation of the log to bring it to a rotational orientation that he estimates to be optimum for sawing. The log is transferred to the grip of the transfer mechanism and is then scanned, as illustrated in FIG. 8c, to obtain measurements from which a calculated plane K in the log can be determined and its relationship to the reference plane M1 (and hence to the cutting plane S) can be ascertained.

Transfer Mechanism

The transfer mechanism 9 by which a log is moved from the measuring station 8 to the feed mechanism 7 comprises a carriage 35 which is elongated in the feed direction and which is guided for horizontal motion transverse to its length by means of fixed parallel rails 36. Upper and lower rollers 37 and 38 on the carriage 35 engage the top and bottom surfaces of the rails 36 to confine the carriage to translatory motion along the rails. Such motion can be imparted to the carriage by means of a double-acting cylinder motor 39 which reacts between the carriage 35 and a stationary part of the machine frame and which is connected with a valve 139 in the hydraulic system 120 to be controlled manually or (preferably) automatically in a manner which will be evident from the functions that it performs.

The log to be transferred is secured to the carriage 35 by means of pairs of gripper jaws 41, so located along the length of the carriage that each pair of gripper jaws is spaced a small distance along the length of the carriage from one of the log supports 21a–21d of the measuring station, so that each of those log supports has its corresponding pair of gripper jaws 41. To permit the gripper jaw pairs 41 to be individually raised and lowered relative to the carriage, each pair of gripper jaws is mounted on an elevator frame 42. Each elevator frame 42 is constrained to move with the carriage and is guided for up and down motion relative to the carriage by means of upright guide posts 43 that are fixed to the carriage and are engaged by suitable guide rollers on the elevator frame. Each elevator frame 42 is raised and lowered by means of its own cylinder motor 44, which reacts between the elevator frame and the carriage, and each motor 44 is connected with its own control valve 144 in the hydraulic circuit 120.

Each of the gripper jaws 41 comprises a lever-like jaw member that is pivoted to the elevator frame for the jaw pair. The two jaws of each pair are respectively swingable about parallel horizontal axes defined by shafts 45, to which the jaw members are rigidly secured. Also rigidly secured to each shaft 45 is a lever arm 46 that projects away from the jaw member. Connected between the free ends of the lever arms 46 is a double-acting cylinder motor 47 which diverges the jaw members 41 when it contracts and converges them when it extends. Each cylinder motor 47 is controlled by its own valve 147 in the hydraulic circuit 120. To coordinate the swinging movements of the two jaw members 41 of each pair, so that they swing symmetrically to a vertical plane midway between their axes, a suitable linkage 48 is connected between their shafts 45.

When the cylinder motor 47 for a pair of jaw members 41 is fully contracted, those two jaw members are in nearly horizontal attitudes, so that they can pass under a log that is supported in the operative log supports 21 at the measuring station. Furthermore, when the carriage 35 is moved to the measuring station by extension of the cylinder motor 39, each of the elevators 42 is in its lowermost position, to ensure that the open jaws will be spaced beneath the log as they pass under it. Two of the elevators can then be raised, by means of their respective cylinder motors 44, until they just engage the underside of the log, and thereupon the pairs of gripper jaws 41 on those elevators can be swung shut, to engage against opposite sides of the log, by extension of their cylinder motors 47. The pairs of gripper jaws 41 that engage the log are of course those that correspond to the log supports 21a–21d then engaging it. Once the log is thus securely held by the transfer mechanism, the chain arms 22, 23 at the measuring station are swung down to their horizontal positions, to be clear of the log as it is carried out of the measuring station and towards the feed mechanism 7 upon contraction of the cylinder motor 39 for the carriage 35. As the log is carried towards the feed mechanism, a new log can be delivered to the measuring station.

As explained above, transferring support of the log from the V-shaped chain arms 22, 23 to the jaws 41 may cause some lateral displacement of the log, because the jaws 41 do not engage the same portions of its surface as the chain arms 22, 23, and because the cross-section of the log is not perfectly circular. Therefore a scanning takes place after the log is in the grip of the jaws 41 but before it leaves the measuring station. Since the transfer mechanism carries the log to the feed mechanism without rotation, through a predetermined distance, and with a lateral motion that is accurately known (inasmuch as it is purely translatory), the log will arrive at the feed mechanism with its calculated plane K in exactly a known relationship to the cutting plane S.

During lateral transport of the log from the measuring station to the feed mechanism, or immediately upon the conclusion of that lateral transport, the elevator motors 44 for the two pairs of jaws 41 that grip the log are operated to lift the log, without change in its orientation, to a vertical position in which it is to pass through the cutting machine and in which a desired trimming cut will be made by the planer 12. With the log in that position, it is gripped by the feed mechanism in such a manner (as explained hereinafter) that no movement of the log takes place during its transfer from support by the transfer mechanism to support by the feed mechanism.

Feed Mechanism

The feed mechanism 7 to which the log is delivered by the transfer mechanism 9 comprises an inner feed carriage 50 and an outer feed carriage 51, both of which move along tracks provided by a pair of parallel I-beams 52 that are supported on suitable uprights 53 at an elevation some distance above the top of the cutting machine 5. These I-beams extend horizontally in the feed direction and have their front end portions over the cutting machine 5. Each I-beam has inner flanges 54 that project laterally towards the other I-beam, and these inner flanges of the two I-beams cooperate to provide the rails of an inner track upon which the inner feed carriage 50 is supported and guided. The opposite or outer flanges 55 on the I-beams, which project away from one another, define the rails of an outer track upon which the outer feed carriage 51 is supported and guided.

The inner feed carriage 50 lies wholly between the rails of the inner track. The outer feed carriage 51, however, straddles or bridges across both sets of tracks and engages the rails of the outer track at their outer or remote sides. It will be apparent, therefore, that the carriages 50 and 51 can pass each other freely as they move in either direction along the tracks.

Each of the feed carriages is equipped with a pair of pincers-like gripping jaws, the jaws on the inner carriage 50 being designated 56 and those on the outer carriage 51 being designated 57. These pincers-like jaw elements on each carriage project obliquely downwardly and forwardly from the carriage, so that they can cooperate to support a log at an elevation suitable for its feed to the sawing machine. The jaw elements are thus at the level of a feed line along which the log moves in its feeding motion. In each case the jaw elements 56, 57 on a carriage 50, 51 are swingable toward and from one another about a vertical axis. As the description proceeds, it will be apparent that the structure which supports and controls the jaw elements 56 on the inner carriage 50 is located wholly between the inner rails, whereas the structure that supports and controls the jaw elements 57 on the outer carriage 51 is located above the inner tracks and laterally outside the outer tracks; and this arrangement, too, is for the purpose of enabling the carriages 50 and 51 to pass one another.

It will now be apparent that with the feed carriages 50 and 51 occupying starting positions along the tracks, such as their positions shown in FIG. 3, the carriage 35 of the transfer mechanism can be brought to a position in which a log thereon is more or less centered between the I-beams 52 that provide the feed mechanism tracks; and with the log vertically positioned at the level of the feed line, as explained above, it can be gripped by the jaw elements 56 and 57 on the respective feed carriages 50 and 51. Thereupon, the gripper jaws 41 of the transfer mechanism can be swung apart and downwardly by contraction of their cylinder motors 47, and the carriage 35 of the transfer mechanism can be returned to the measuring station 8 for another log.

As the explanation proceeds, it will be seen that when the pincers-like jaw elements 56, 57 on the two feed carriages 50, 51 are converged to grip a log supported by the transfer mechanism, they adjust themselves laterally, to securely clamp the log without shifting it; and thereafter they can be swung laterally, with the clamped log, to establish the log in the desired lateral position and orientation. For an understanding of how this is accomplished, attention must now be given to details of the two carriages 50, 51 of the feed mechanism.

The outer carriage 51 comprises a rectangular horizontal frame 59 that is wide enough to span the I-beams 52 and is supported at an elevation well above the I-beams on legs 60 that project down from its four corners. The two legs 60 at each side of the carriage have their lower ends connected by a short beam 61 that lies laterally outwardly of the outer I-beam flanges 55 and on which are mounted freely rotatable rollers 62 that engage the flanges 55 to supportingly guide the carriage. At each side of the carriage the frame 59 and the beam 61 conjointly support and journal an upright shaft 64 that is confined to rotation. Note that each of the shafts 64 is located laterally outwardly of the outer flanges 55 of its adjacent I-beam, and that the lower end portion of each shaft is at a level below the I-beams. To the lower end of each of the shafts 64 is anchored one of the arms 65 that comprise the pincers-like gripping element 57 on the carriage 51. By simultaneous rotation of the shafts 64 in opposite directions, the two arms 65 can be swung towards or away from one another. Such rotation is imparted to the shafts 64 by means of a lever arm 66 fixed to the upper end of each of the shafts 64 and a double-acting cylinder motor 67 that is connected between the free outer ends of those two lever arms. The lever arm 66 on each shaft 64 projects laterally from that shaft in the same direction as its associated jaw arm 65, and therefore contraction of the cylinder motor 67 converges the jaws and its expansion diverges them. Through a control valve 167 the jaw actuating cylinder motor is connected in a hydraulic circuit with a pump P2 that provides a source of pressure fluid.

For shifting the lateral position of the converged jaw elements 57, each of the shafts 64 has a further laterally projecting lever arm 70, 71 secured to its upper end, the lever arm 70 on one shaft being oriented more or less forwardly while the lever arm 71 on the other shaft is oriented more or less rearwardly. Connected between the outer ends of these lever arms 70 and 71, and comprising an adjustable-length link between them, is another double-action cylinder motor 72. The cylinder motor 72 is controlled by means of a four-condition control valve 172 which is connected in the hydraulic circuit comprising the pump P2. The control valve 172 has a "float" condition in which the motor 72 is cut off from the pump P2 and fluid can flow freely between opposite ends of its cylinder so that the motor can readily extend or contract in response to forces exerted upon it by the lever arms 70 and 71. In a "locked" condition of the valve 172, in which the motor 72 is also cut off from the pump P2, fluid is prevented from flowing to and from that motor so that it is confined against extension and contraction. In the other two conditions of the valve 172 it communicates the motor 72 with the pump P2, and in one of those conditions it causes the motor to extend, while in the other it causes the motor to contract. A sensor 73 is connected between the cylinder and the piston rod of the motor 72 to produce an output which corresponds to the prevailing length of the adjustable-length link that comprises the motor 72.

When the jaws 67 are converged to grip a log that is being supported by the transfer mechanism 9, the cylinder motor 72 is allowed to float, so that the jaw arms 65 can swing as necessary to adapt themselves to the position of the log. Once engaged with the log and confined in engagement with it by the converging force exerted upon them by the cylinder motor 67, the distance between the free ends of the jaw arms 65 is fixed, and it will be apparent that contraction of the cylinder motor 72 causes the free ends of those arms (together with the portion of the log that is between them) to be shifted in one lateral direction (downward in FIG. 3), whereas extension of that motor effects an opposite lateral shift of the arms 65 and the log between them. The sensor 73 produces signals that correspond to the direction and magnitude of such lateral shifting, and by means of suitable control circuitry (not shown) to which those signals are fed and which also receives computer outputs signifying the relationship between the calculated plane K in the log and the cutting plane S, the lateral position of the jaw arms 65 is established at the calculated optimum lateral position of the log. With the jaws 65 so positioned, the motor 72 can be put in its "locked" condition to hold the jaws against lateral shifting.

The cylinder motors 67 and 72 on the outer feed carriage 51, and the lever arms with which they respectively connect, are all located at a level substantially above the I-beams 52, so that no interference is presented to the inner feed carriage 50 when the carriages 50 and 51 pass one another.

The gripping elements 56 on the inner feed carriage 50 are actuated and positioned by mechanism which is in most respects similar to the above-described mechanism on the outer carriage 51, but, in addition, the jaw arms 75 that comprise those gripping elements are capable of being swung upwardly, to an inoperative position shown in broken lines in FIG. 2 and in which they are at a level just below the bottom surfaces of the I-beams 52. In this inoperative position they can readily pass between the upper portions of the jaw arms 65 of the outer feed carriage 51.

The inner carriage 50 comprises a horizontal rectangular frame 76 having lengthwise extending side members 77 on which there are rollers 78 that engage the inner flanges 54 of the I-beams, to movably support the frame. The side members also provide bearings for a cross-beam 79 that extends between them and is rotatable about a horizontal axis which extends lengthwise in it and which is thus transverse to the feed direction. Shafts 80 that correspond generally to the shafts 64 on the outer carriage are journaled in the rotatable cross-beam 79 and have the jaw arms 75 secured to their lower ends, so that rotation of the cross-beam 79 about its axis raises those jaw arms to their inoperative position or lowers them to the operative position shown in full lines in FIG. 2. Such swinging motion is imparted to the rotatable cross-beam 79 by means of a double-acting cylinder motor 81 which has one of its ends connected to one of the end members of the frame 76 and its other end eccentrically connected to the rotatable cross-beam. The cylinder motor 81 is connected with a control valve 181 that is in a circuit with a pump P3.

The jaw arms 75 on the inner feed carriage are converged and diverged by means of a double-acting cylinder motor 83, corresponding to the cylinder motor 67 on the outer carriage and connected between lever arms 84 fixed to the upper ends of the shafts 80. The motor 83 is controlled by means of a valve 183 in circuit with the pump P3.

The inner carriage has a lateral jaw shifting arrangement which is essentially like the one on the outer carriage, comprising forwardly and rearwardly projecting lever arms 86 and 87, secured to the upper ends of the respective shafts 80, and a double-acting cylinder motor 88 connected between the ends of the arms 86 and 87. A valve 188 for controlling the motor 88, connected in circuit with the pump P3, again provides for "float" and "lock" as well as for contraction and extension of that motor; and a sensor 89 is arranged to produce signals corresponding to the direction and magnitude of lateral shifting of the jaw arms 75.

As pointed out above, the log arrives at the feed mechanism with its calculated plane K in a known relationship to the cutting plane S, as denoted by the distances ΔX' and ΔX" in FIG. 8d, and the lateral shifting that is imparted to the gripping elements 56 and 57 on the feed carriages is such as to establish the log with that calculated plane parallel to the cutting plane S and at a predetermined distance from it. Said distance may be zero, that is, the planes K and S may in some cases be required to coincide. Such lateral shifting is of course effected under the control of the computer (not shown) in cooperation with the sensors 73 and 89.

The carriages 50 and 51 are moved along their tracks in feed and return directions by means of reversible electric motors 90 and 91, respectively, that are supported on the rear end portions of the I-beams 52. The motor 90 drives inner feed carriage 50 through a reducing gear box 92 and a rotatable horizontal drive shaft 93 that extends transversely to the feed direction and is rotatably-driven from the gear box 92 by means of a chain drive transmission generally designated 94. Secured to the opposite ends of the drive shaft 93 are drive sprockets 95 that overlie the inwardly projecting flanges 54 of the I-beams. A freely rotatable sprocket 96 is mounted over the front end of each of the I-beams, in line with each of the drive sprockets 95 on the drive shaft 93. Over the driving and driven sprockets 95, 96 at each side of the feed mechanism an endless chain 97 is trained to have straight upper and lower stretches which extend in the feed direction. The lower stretch of each chain 97 is secured to the inner carriage 50, and hence, as that chain stretch moves forward or backward, driven by the motor 90, the inner carriage is constrained to move with it in the feed direction or the return direction.

The motor 91 that drives the outer carriage 51 is similarly drivingly connected, through a reducing gear box 98, with a rotatable drive shaft 99 that is parallel to the drive shaft 93. Like the shaft 93, drive shaft 99 has a sprocket 100 secured to each of its ends, but the sprockets 100 overlie the outer flanges 55 of the I-beams. A second freely rotatable sprocket 102 is mounted at the front of the feed mechanism, over each of the I-beams, in line with each of the driving sprockets 100, and an endless chain 103 is trained around each driving sprocket 100 and its aligned front sprocket 102. The lower stretch of each such chain 103 is connected with the outer feed carriage 51.

A sensor 104, 105 is provided for each of the feed carriages 50, 51, respectively, to produce outputs that enable the computer to monitor and control the positions of the carriages along the I-beams 52. As shown, the sensors 104, 105 are connected with the respective drive shafts 93, 99 through which the carriages are propelled in their feeding and return motions.

Assuming that the feed carriages 50 and 51 have the relationship shown in FIG. 3, with the inner carriage 50 supporting the front portion of a log and the outer carriage 51 supporting its rear portion, the jaw elements 55, 56 on the respective carriages will maintain their grips on the log until the front end of the log has entered the bite of the feed rolls 15. At that point the inner feed carriage 50 will have reached the limit of its motion in the feed direction, and its jaw elements 56 are disengaged from the log. The front end portion of the log is then supported, guided and driven in the feed direction by the feed conveyor 13 in cooperation with the feed rolls 15, while the rear end portion of the log continues to be supported by the outer feed carriage 51, which of course continues to move in the feed direction.

As soon as the jaw elements 56 of the inner carriage 50 are disengaged from the log, they are swung up to their inoperative position, and the inner carriage can move in the return direction to a position suitable for supporting the next log, which is by then moving towards the feed mechanism on the transfer mechanism carriage 35. In moving to that position, the inner feed carriage 50 of course passes the outer carriage 51, which continues to support the rear end portion of the log and to move in the feeding direction. The point at which the inner carriage stops its return motion depends upon the length of the log then on the transfer mechanism carriage and can be controlled automatically in response to signals concerning the detected length of that log. The carriage position sensor 104 is of course employed for purposes of such automatic control.

When the outer carriage 51 reaches the forward limit of its feeding stroke, which is at about the location from which the inner carriage began its return movement, its jaw arms 65 are swung apart to be disengaged from the log, and it can immediately begin a return movement. During feeding of the log just released, the outer carriage 51 was in the trailing position, but for feeding the next log it will be in the leading position; and therefore its return motion is a relatively short one and very quickly accomplished. It will be seen that for each successive log the carriages 50, 51 reverse their leading-trailing relationship. If the logs are end-aligned on the transverse plane 18, as is preferred, the leading carriage—whichever one it may be—can always start its feeding movement from the same location, a small distance behind the transverse plane 18, to which location each carriage can be brought automatically with the aid of outputs from the sensors 104, 105.

Modified Embodiments

From the foregoing description of the jaw shifting devices on the feed mechanism carriages, comprising the respective adjustable length links 72 and 88, an obvious modification of the method and apparatus of this invention will suggest itself to those skilled in the art. The pairs of jaws on the transfer mechanism 9 could be provided with shifting devices generally similar to those for the jaws on the feed mechanism carriages, and in that case the log would undergo no movement whatsoever as it was being transferred from support by the log supports at the measuring station 8 to the sets of jaws on the transfer mechanism 9, since the transfer mechanism jaws would be self-adjusting. Hence all scanning could be accomplished before the log was gripped by the sets of jaws on the transfer mechanism. Then, by controlled shifting of the transfer mechanism jaws, the log could be brought to an orientation at which the calculated plane K in it would be in the required relationship to the cutting plane S immediately before the log was engaged by the jaws of the feed mechanism. The jaws of the feed mechanism would then adapt themselves to the lateral orientation of the log as they converged upon it, and when they engaged the log it would be in the desired position and orientation for feed to the cutting machine so that feeding motion could begin at once.

Another obvious modification of the herein disclosed invention would eliminate supports at the measuring station that would engage the irregular side surface of the log, like the chain arms 22, 23, and would replace them with coaxial elements for engaging the opposite end surfaces of the log, said elements defining an axis extending through the log and about which the log would be controlledly rotatable. Such supporting elements could comprise a pair of taper pins or a pair of rotatably mounted elements of the type disclosed in U.S. Pat. No. 3,190,323, to N. T. G. Johansson and therein referred to as "a toothed striking member." In any case, rotation of the log would be controlled from the instant when scanning commenced. Since the log would undergo no lateral shifting in the course of its rotation, calculation would be simplified and would probably be more accurate, but the log handling mechanism might have to be more complicated if processing delays were to be avoided. The jaws on the transfer mechanism would have to be self-adjusting, to avoid any lateral shifting of the log during its transfer from the supporting elements to the measuring station, and then it would be unnecessary to subject the log to another scanning after it was in the grip of the transfer mechanism. At the possible cost of some production delay, the coaxial supporting elements that gripped the ends of the log could be mounted on the transfer mechanism, to replace the jaws 41 thereon, and the log would then be supported by those elements both during scanning at the measuring station and during transfer to the feed line; but such an arrangement would avoid production delays only if multiple sets of supporting elements were arranged in a complex and presumably space-consuming carrier mechanism.

Finally, it has been assumed for purposes of simplification in most of the foregoing explanation that the reference plane M1 is parallel to the cutting plane S, and that the carriage 35 of the transfer mechanism moves with a purely translatory motion through a fixed distance denoted by X in FIG. 8c. Such an arrangement is preferred. But conceivably the carriage of the transfer mechanism, or its equivalent, could move in a curved path (e.g., be carried by swinging arms), and in that event the reference plane would be inclined to the cutting plane. Nevertheless, the two planes M1 and S would still have to be in a known and fixed relationship to one another, and the carriage (or its equivalent) of the transfer mechanism would move along a defined, predetermined path through a known and fixed distance so that at the conclusion of its motion the log carried by the transfer mechanism would have its calculated plane K in the same relationship to the cutting plane S that it had to the reference plane M1 just before transfer motion began, except insofar as the position and orientation of the log might be corrected by shiftable jaws on the transfer mechanism.

Figure 9:
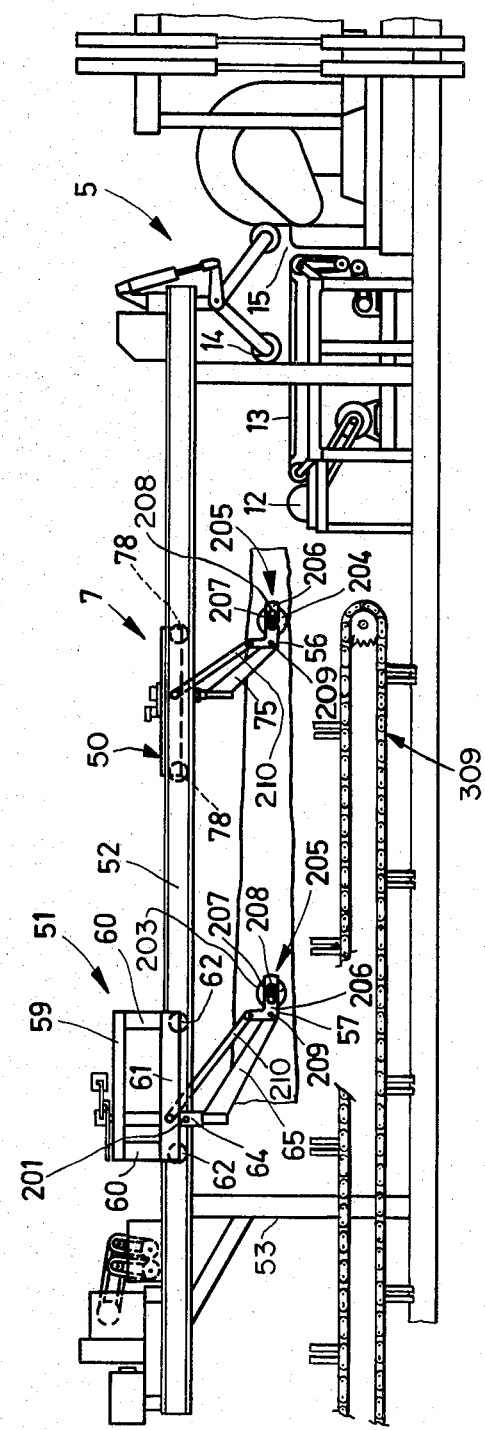
FIG. 9 is a side view generally similar to FIG. 2 but illustrating a modified embodiment of the invention.

In the embodiment of the invention illustrated in FIG. 9, the measuring station (not shown) instead of being spaced to one side of the cutting machine, is located generally in line with the cutting plane S of the cutting machine. Logs are advanced substantially lengthwise into the measuring station and continue in substantially lengthwise movement to a location just below the feed mechanism, whence transfer of the logs to the feed mechanism takes place in accordance with the essential principles of this invention as described above, but with certain modifications which have been found advantageous in many cases.

In FIG. 9 the logs are assumed to be transported in substantially lengthwise translatory motion from the measuring station towards the feed mechanism, as by means of an endless chain conveyor 309 that has V-shaped supports at intervals along its length. It will be understood that the measuring station (not shown in FIG. 9) can comprise scanning apparatus like that illustrated in FIG. 1, but with the possible simplification that there need not be provision for scanning movement of the array cameras if the logs maintain their lengthwise movement while passing through the measuring station and while scanning is taking place, as is possible, for example, if they are manually oriented in rotation before arriving at the measuring station. In this case the reference plane M1 in the measuring zone can coincide with the cutting plane S.

Forward movement of each log from the measuring station brings it to a position directly beneath the feed mechanism. In this case the jaw arms 65 and 75 of the feed mechanism carriages 50 and 51 serve to lift the log to the level of its feed path through the cutting machine, at which level the log in FIG. 9 is shown.

As previously described, the jaw arms 75 on the inner carriage 50 are swingable up and down between the FIG. 9 feed position and a fully raised position (shown in broken lines in FIG. 2) that permits the carriages 50 and 51 to pass one another; but in this case the jaw arms 75 are further swingable between the feed position and a lowered position in which they can grippingly engage a log at a level beneath the feed path.

The jaw arms 65 on the outer carriage 51 must in this case be arranged so that they can likewise be swung up and down between the feed path level and the lower level just mentioned. For such swinging movement, the shaft 64 about which each of the arms 65 is laterally swingable is in turn swingable on a transverse horizontal shaft 201 that is secured to the outer carriage 51.

The gripping element 205 on each of the jaw arms 65, 75 comprises in this case an L-shaped bracket 206 having an upright leg and a horizontal leg. The horizontal leg of each bracket 206 has a lengthwise extending slot 207 therein. The gripping elements proper, designated 203 and 204 for the respective jaw arms 65 and 75, comprise in each case a toothed disc-like log engaging head having an outwardly projecting concentric pin 208 thereon that is received in the slot 207. The pin-and-slot connections 207, 208 enable the log-engaging heads to maintain their rotational orientations relative to a gripped log as the arms 67, 75 swing upwardly and permit them to have limited motion relative to the jaw arms, to accommodate changes in the distance between pairs of jaw arms as they swing upwardly.

The legs of each L-shaped bracket 206 are maintained in their respective vertical and horizontal orientations by means of link rods 210 that extend parallel to the respective jaw arms 65, 75 and cooperate with them and with a pivotal connection 209 between each jaw arm and its L-shaped bracket to provide a parallelogram linkage that also comprises the vertical shaft on which the jaw arm swings laterally.

The coordinated swinging of the jaw arms between the feed path level and the lower level at which logs are transported to the feed mechanism can be provided for by elevator means on each carriage 50, 51 which can in each case correspond generally to the above described mechanism comprising cross-beam 79 and cylinder motor 81, best seen in FIG. 5. It will be observed that the logs have to be lifted through a distance which need be no more than a few millimeters greater than the maximum thickness of the thickest expectable log. It will also be evident that because the jaw arms 55, 65 have a component of forward motion as they lift a log into the feed path, transfer of a log to the feed mechanism from a conveyor that carries them horizontally towards the feed mechanism involves little or no delay in forward movement of that conveyor.

It will be apparent that with the FIG. 9 embodiment logs can move more or less steadily lengthwise through the measuring station and to the feed mechanism. There will of course be no change in the orientation of the log from the time it leaves the measuring station until it arrives at the feed mechanism, so that the calculated plane K in the log will have the same relationship to the cutting plane S that it had to the reference plane M1 at the measuring station, especially since, with this arrangement, the reference plane can coincide with the cutting plane. As soon as the log is securely engaged by the jaw arms 65, 75, its lateral position and orientation can be adjusted as described above, by laterally shifting one or both of the pairs of jaw arms 65, 75 to bring $\Delta X'$ and $\Delta''$ (FIG. 8c) to zero. It can be advantageous to arrange the remote control devices that control the lifting movements of the jaw arms 65, 75 in such a manner that those arms are controlled from a computer in the same way that lateral adjustment of the log is accomplished, as described above, so that in accordance with an optimizing calculation made by the computer, the underside of the log can be so planed down as the log passes over the cutter 12 of the cutting machine that there is produced a lengthwise extending flat bottom surface at a predetermined level on the log.

From the foregoing description taken with the accompanying drawings, it will be apparent that this invention provides a highly efficient apparatus for feeding successive logs through a cutting machine, whereby a steady flow of logs through the cutting machine is maintained without substantial delay between successive logs and whereby every log is individually positioned and oriented for optimum yield in accordance with its particular geometry.

Those skilled in the art will appreciate that the invention can be embodied in forms other than as hereindisclosed for purposes of illustration.

I claim:

1. Apparatus comprising a feed mechanism by which a log is fed to a cutting machine in horizontal substantially lengthwise translatory motion parallel to a vertical cutting plane through the cutting machine, said feed mechanism comprising carriage means constrained to move horizontally in opposite directions parallel to the cutting plane and two pairs of jaws on the carriage means, projecting downwardly to a level beneath the carriage means, for gripping opposite sides of a log to constrain the log to move with the carriage means, said apparatus being characterized by:
   A. measuring station means defining a reference plane that is spaced a distance to one side of said cutting plane, said measuring station means comprising
      (1) a pair of supporting devices that are movable to and from an operative position in which the supporting devices can cooperate to cradle a log near opposite ends thereof and substantially confine the log to rotation, with the log at a measuring level below said level of the jaws of the feed mechanism and its length substantially horizontal, and with the log approximately in lengthwise symmetry to said reference plane, and
      (2) means for moving said supporting devices between their said operative position and an inoperative position in which the supporting devices are below said measuring level;
   B. transfer mechanism comprising
      (1) a transfer carriage constrained to horizontal motion transversely to said planes, through said distance,
      (2) a pair of elevators on said transfer carriage constrained to move through said distance with the transfer carriage but movable up and down relative to the transfer carriage, and
      (3) a pair of gripping elements on each elevator, the gripping elements of each pair being swingable toward and from one another and cooperable with their elevator to pass under a log supported by said supporting devices and grip the log, to thus provide for transfer of the log from the supporting devices to the transfer mechanism, with the log in a rotational orientation established for it at the measuring station and in a lateral orientation established for it by the gripping elements;
   C. actuating means on the carriage means of the feed mechanism, reacting between the two jaws of each pair thereof, for converging the jaws in any positions transversely of the cutting plane in which the jaws establish themselves when they converge upon a log to grip it; and
   D. means on the carriage means for adjustably shifting each of said pairs of jaws laterally to enable a log supported by the feed mechanism to be established in a desired lateral position and orientation relative to the cutting plane.

2. Log sawing apparatus comprising a cutting machine that defines a vertical cutting plane, measuring station means spaced horizontally from said cutting machine and at which a log to be sawed is established in a desired rotational orientation and a determination is made of the lateral orientation that the log should have relative to said cutting plane during cutting for optimum yield from the log, and transfer mechanism by which a log is carried in translatory motion from said measuring station to a location at which the log is transferred to feed mechanism that feeds it to the cutting machine in horizontal generally lengthwise translatory feed motion along a defined path parallel to said cutting plane, said feed mechanism comprising carriage means confined to horizontal motion in opposite directions parallel to the cutting plane and two pairs of jaw members carried by said carriage means and by which a log is supported for feed motion, said log sawing apparatus being characterized by:
   A. said location being spaced vertically from said defined path;
   B. means on the carriage means mounting the two jaw members of each pair
      (1) for motion in opposite directions substantially normal to the cutting plane and
      (2) for up and down movement in unison;
   C. two actuating devices, one for each pair of jaw members, each of said actuating devices being connected between the jaw members of its pair to converge and diverge those jaw members by reaction between them and thus enable them to adjust themselves to the position of a log as they grippingly engage it;
   D. lateral adjustment means for each pair of jaw members, operative when the jaw members of a pair are in gripping engagement with a log to effect unison lateral motion of the two jaw members in each direction normal to the cutting plane, each said lateral adjustment means comprising a reversible actuator which, in addition to being arranged to effect movement in opposite directions, is arranged to have
  (1) a free condition in which the jaw members of the pair are unimpeded by the lateral adjustment means in their unison lateral movements, and
  (2) a locked condition in which the jaw members of the pair are confined against unison lateral motion; and
E. actuating means on said carriage means connected with each pair of jaw members for moving the pairs of jaw members up and down simultaneously, so that a log supported by the transfer mechanism at said location can be gripped by said jaw members and translated substantially vertically by them to the level of said path.

3. The log sawing apparatus of claim 2, wherein each of said jaw members comprises an elongated arm having a free end portion that is swingable horizontally and up and down, further characterized by:
  F. a bracket on said free end portion of each arm having an elongated slot therein;
  G. a link connected with the bracket for each arm and cooperating with the arm to maintain the bracket in an orientation in which said slot extends horizontally as the bracket is raised and lowered; and
  H. a gripping element slidably and rotatably mounted in the slot in each bracket, for engagement against a log gripped by the jaw member, the slidable and rotational mountings of the gripping members enabling them to remain fixed in engagement with a log as the jaw members are raised and lowered.

4. Apparatus comprising a feed mechanism by which an elongated workpiece such as a log is fed to a cutting machine in horizontal substantially lengthwise translatory motion along a feed path parallel to a vertical cutting plane through the cutting machine, said feed mechanism comprising carriage means, means constraining said carriage means to move horizontally in a feed direction parallel to the cutting plane, and holding means on the carriage means for constraining a workpiece to move with the carriage means, said apparatus further comprising measuring means at a measuring station horizontally spaced from the feed mechanism, whereby measurements are taken of the contours of a workpiece in relation to a reference plane that has a known relation to said cutting plane, for ascertainment of a lateral position and orientation of the workpiece in relation to the cutting plane that will be optimum for feed of the workpiece through the cutting machine, said apparatus being characterized by:
  A. transfer mechanism for carrying a workpiece in translatory motion from the measuring station to a location in which the workpiece is adjacent to said holding means but in vertically spaced relation to said feed path, said transfer mechanism comprising
    (1) a set of workpiece supporting members by which two lengthwise spaced apart portions of the workpiece are supportingly engaged at said measuring station, and
    (2) transport means by which the supporting members of said set are carried in spaced relation to one another and by which they are constrained to move in unison in the direction from said measuring station to said location;
  B. said holding means on the carriage means comprising
    (1) two pairs of jaws for gripping opposite sides of a workpiece at said location, comprising a set of jaws,
    (2) actuating means reacting between the two jaws of each pair for converging those jaws in any position transversely of the cutting plane in which they establish themselves when they converge upon a workpiece to grip it, and
    (3) means on the carriage means for adjustably shifting at least one of said pairs of jaws laterally while a workpiece is gripped by said set of jaws, to enable a workpiece supported by the feed mechanism to be established in said lateral position and orientation; and
  C. elevator means for effecting up and down motion of one of said sets relative to the other, so that a workpiece at said location can be transferred to said set of jaws and translated vertically into said feed path without change in its orientation, and, after being engaged by said set of jaws, can be shifted laterally to said lateral position and orientation before reaching the cutting machine.

5. Apparatus comprising a feed mechanism by which an elongated workpiece such as a log is fed to a cutting machine in horizontal substantially lengthwise translatory motion along a feed path parallel to a vertical cutting plane, and means defining a measuring station spaced a substantial distance horizontally from said feed mechanism and at which a workpiece is supported in a predetermined position of rotation and at a level that is vertically spaced from the level of said feed path to be measured for determination of the relationship between a calculated plane in the workpiece and a reference plane at the measuring station that has a known relationship to said cutting plane, said apparatus being characterized by:
  A. a carrier constrained to substantially horizontal motion along a defined transfer path from the measuring station to a position vertically adjacent to the feed mechanism;
  B. a set of workpiece supporting elements on said carrier comprising two spaced apart pairs of members arranged to supportingly engage lengthwise spaced apart portions of a workpiece and confine the workpiece against horizontal and rotational motion relative to the carrier so that the workpiece is constrained to move with the carrier along said transfer path and to arrive at said position with its calculated plane in the same relationship to the cutting plane that it had to the reference plane at the measuring station;
  C. said feed mechanism comprising
    (1) carriage means constrained to back and forth motion along said feed path, and
    (2) another set of workpiece supporting elements on said carriage means comprising two pairs of supporting members;
  D. one of said sets of workpiece supporting elements being arranged for vertical movement in unison to provide for translatory motion of a workpiece from its said level at the measuring station to said level of the feed path;
  E. actuator means connected between the two supporting members of each pair thereof of said set of workpiece supporting elements on the carriage means, for relatively converging and diverging those supporting members so that they can grip a workpiece supported by the set of workpiece supporting elements on the carrier without changing the position or orientation of the workpiece; and F. other actuator means carried by said carriage means for unison lateral shifting of at least one of said pairs of supporting members of said set of supporting elements thereon, to enable a workpiece supported thereby to be brought to an orientation in which its said calculated plane is in a desired relationship to the cutting plane.

6. The apparatus of claim 5 wherein said measuring station is spaced laterally to one side of said feed path and said reference plane is parallel to said cutting plane, further characterized by:
(1) said carrier comprising a transfer carriage confined to motion in opposite directions normal to said planes, and
(2) the set of workpiece supporting elements on said transfer carriage comprising
  (a) two pairs of jaw members and
  (b) further actuator means connected between the jaw members of each pair for converging them and diverging them relative to one another so that they can grip a workpiece at the measuring station substantially without shifting the workpiece; and
(3) said two pairs of jaw members being arranged on the transfer carriage for up and down movement in unison so that they can be lowered to pass beneath a workpiece at the measuring station, raised to a level at which they can grip that workpiece, and further moved vertically to translate the gripped workpiece to said level of the feed path.

7. The apparatus of claim 5 wherein said feed mechanism is spaced from the measuring station in one direction lengthwise of the feed path and said reference plane is substantially coplanar with the cutting plane, further characterized by:
(1) said carrier being confined to movement in said direction; and
(2) the set of workpiece supporting elements on said carriage means beig arranged for vertical movement in unison.

8. The apparatus of claim 7, further characterized by each of the supporting members of said set of workiece supporting elements on the carriage means comprising:
(1) a lever arm having one end portion formed as a workpiece engaging member, and
(2) a pair of shafts that have mutually transverse axes, one of which extends horizontally, and which cooperate to provide a connection between said carriage means and the other end portion of said lever arm about which the workpiece engaging member is swingable both horizontally and vertically.

9. Log sawing apparatus comprising a cutting machine that defines a cutting plane, measuring station means spaced from said cutting machine and at which a log to be sawed is established in a desired rotational orientation and a determination is made of a plane in the log that should be parallel to said cutting plane during cutting for optimum yield from the log, feed mechanism by which the log is fed to the cutting machine, and transfer mechanism by which the log is carried from said measuring station to said feed mechanism and by which its rotational and lateral orientations are controlled while it is so carried, said feed mechanism comprising carriage means confined to horizontal motion in opposite directions parallel to the cutting plane and two pairs of jaw members carried by said carriage means and by which a log is supported for horizontal substantially lengthwise translatory feed motion parallel to said cutting plane, said log sawing apparatus being characterized by:
A. means on the carriage means mounting the two jaw members of each pair for motion in opposite directions substantially normal to the cutting plane;
B. two actuating devices, one for each pair of jaw members, each of said actuating devices being connected between the jaw members of its pair to converge and diverge those jaw members by reaction between them and thus enable them to adjust themselves to the position of a log as they grippingly engage it; and
C. lateral adjustment means for each pair of jaw members, operative when the jaw members of a pair are in gripping engagement with a log to effect unison motion of the two jaw members in each direction normal to the cutting plane, each said lateral adjustment means comprising a reversible actuator which, in addition to being arranged to effect movement in opposite directions is arranged to have
(1) a free condition in which the jaw members of the pair are unimpeded by the lateral adjustment means in their movements in said directions normal to the cutting plane, and
(2) a locked condition in which the jaw members of the pair are confined against movements in the last-mentioned directions.

10. The log sawing apparatus of claim 9, further characterized by:
said lateral adjustment means for each pair of jaw members further comprising
(1) a pair of lever arms, each having a motion transmitting connection with one of the jaw members of its pair,
  (a) one of said lever arms extending in one direction along said plane from the axis of its connected jaw member and
  (b) the other of said lever arms extending in substantially an opposite direction along said plane from the axis of its connected jaw member, and
(2) said actuator being connected between said lever arms and being extendable and contractable to swing the jaw members in one lateral direction upon its extension and in the opposite lateral direction upon its contraction.

11. Apparatus comprising a feed mechanism by which a log is fed to a cutting machine in horizontal substantially lengthwise translatory motion parallel to a vertical cutting plane through the cutting machine, said feed mechanism comprising carriage means constrained to move horizontally in a feed direction parallel to the cutting plane and holding means on the carriage means for constraining a log to move with the carriage means, said apparatus being characterized by:
A. measuring station means spaced a distance to one side of said cutting plane,
  (1) said measuring station means defining a reference plane having a known relationship to said cutting plane, and
  (2) said measuring station means comprising a pair of supporting devices cooperable to cradle a log near opposite ends thereof and substantially confine the log to rotation, with the length of the log substantially horizontal and with the log approximately in lengthwise symmetry to said reference plane;

B. transfer mechanism for carrying a log from the measuring station to the feed mechanism and by which the log is presented to the feed mechanism in the same rotational orientation to the cutting plane that it had to the reference plane at the measuring station, said transfer mechanism comprising
  (1) transport means confined to a predetermined course of motion in opposite directions through said distance,
  (2) a pair of elevators on said transport means, each constrained to motion in said course with the transport means but movable relative to the transport means in opposite directions that are transverse to said course of motion and to the feed direction, and
  (3) a pair of gripping elements on each elevator, the gripping elements of each pair being cooperable with one another and with their elevator to grip a log supported by said supporting devices and to prevent rotation of the log relative to the transfer mechanism while constraining the log to motion with the elevators; and C. said holding means on the carriage means comprising
  (1) two pairs of jaws for gripping opposite sides of a log presented to the feed mechanism by the transfer mechanism,
  (2) actuating means reacting between the two jaws of each pair for converging the jaws in any positions transversely of the cutting plane in which the jaws establish themselves when they converge upon a log to grip it, and
  (3) means on the carriage means for adjustably shifting each of said pairs of jaws laterally to enable a log supported by the feed mechanism to be established in a desired lateral position and orientation relative to the cutting plane.

12. The apparatus of claim 11, further characterized by:
  (1) said supporting devices of the measuring station means being movable between an operative position at which they cooperate to support a log at a measuring level and in inoperative position in which the supporting devices are below said measuring level,
  (2) said transport means being confined to substantially horizontal translatory motion,
  (3) said elevators being movable up and down on the transport means, to carry the gripping elements to below said measuring level so that the gripping elements can be brought into engagement with a log at the measuring station and to raise a log carried by the gripping elements to above the measuring level for presentation to said jaws of the holding means; and
  (4) said jaws of the feed mechanism projecting downwardly from the carriage means so that a log can be carried upwardly into their grip by the elevators of the transfer mechanism.

* * * * *